(12) United States Patent
Xu et al.

(10) Patent No.: US 9,389,790 B2
(45) Date of Patent: Jul. 12, 2016

(54) METHOD AND APPARATUS FOR DETERMINING REDUNDANT ARRAY OF INDEPENDENT DISKS

(71) Applicant: Huawei Technologies Co., Ltd., Shenzhen, Guangdong (CN)

(72) Inventors: Yan Xu, Shezhen (CN); Yaping Sun, Hangzhou (CN); Huiqiang Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/582,509

(22) Filed: Dec. 24, 2014

(65) Prior Publication Data

US 2015/0178004 A1 Jun. 25, 2015

(30) Foreign Application Priority Data

Dec. 25, 2013 (CN) .......................... 2013 1 0729168

(51) Int. Cl.
*G06F 12/00* (2006.01)
*G06F 3/06* (2006.01)
*G06F 11/10* (2006.01)
*G06F 17/16* (2006.01)

(52) U.S. Cl.
CPC .............. *G06F 3/0619* (2013.01); *G06F 3/061* (2013.01); *G06F 3/064* (2013.01); *G06F 3/0665* (2013.01); *G06F 3/0689* (2013.01); *G06F 11/1076* (2013.01); *G06F 17/16* (2013.01)

(58) Field of Classification Search
CPC ......... G06F 3/0619; G06F 3/06; G06F 3/061; G06F 3/064; G06F 3/0665; G06F 3/0689; G06F 11/1076; G06F 17/16
See application file for complete search history.

(56) References Cited

U.S. PATENT DOCUMENTS 7,752,389 B1 7/2010 Fan

FOREIGN PATENT DOCUMENTS

| CN | 101923496 A | 12/2010 |
|---|---|---|
| CN | 101923501 A | 12/2010 |
| CN | 102880428 A | 1/2013 |

*Primary Examiner* — Shawn X Gu
(74) *Attorney, Agent, or Firm* — Leydig, Voit & Mayer, Ltd.

(57) ABSTRACT

According to the method for determining a redundant array of independent disks provided in the present invention, for an actual physical disk including n disk groups in which each disk group includes m disks, the n disk groups include m2*(m*n) logical blocks, and a logical block matrix corresponding to m distributed RAIDs can be generated. Therefore, a correspondence between the actual physical disk and the distributed RAIDs can be obtained. In a scenario of data storage or the like, a mapping relationship table of the physical disk and the RAIDs does not need to be stored.

33 Claims, 5 Drawing Sheets

METHOD AND APPARATUS FOR DETERMINING REDUNDANT ARRAY OF INDEPENDENT DISKS

CROSS-REFERENCE TO RELATED APPLICATION

This application claims priority to Chinese Patent Application No. 201310729168.1, filed on Dec. 25, 2013, which is hereby incorporated by reference in its entirety

TECHNICAL FIELD

The present invention relates to storage technologies, and in particular, to a method and an apparatus for determining a redundant array of independent disks.

BACKGROUND

A redundant array of independent disks (Redundant Array of Independent Disks, RAID) is a redundant array formed by multiple disks, exists as an independent large-scale storage device in an operating system, and is a core basic technology in the storage field. The RAID may make full use of advantages of multiple hard disks, which can improve a speed of a hard disk and increase a storage capacity, can provide a fault-tolerant function to ensure data security, and is easy to manage. In addition, in a case in which a problem occurs in any hard disk in the RAID, the RAID can still continue to work without being affected by the damaged hard disk.

Existing distributed RAIDs are different RAIDs formed in continuous space of multiple physical disk groups in a distributed manner. A mapping table of a physical disk and RAIDs needs to be stored in a system. However, each time the system performs an operation such as data storage or recovery, the system needs to query the mapping table, thereby occupying storage space of the system, and leading to relatively high costs for maintaining the mapping table by the system and poor reliability.

SUMMARY

In view of this, embodiments of the present invention provide a method and an apparatus for determining a redundant array of independent disks, so as to save storage space of a system, reduce maintenance costs, and improve reliability.

According to a first aspect, an embodiment of the present invention provides a method for determining a redundant array of independent disks, including:

determining that the number m of disks included in each disk group in n disk groups is the number of redundant arrays of independent disks RAIDs that are constructed by the n disk groups, where each RAID corresponds to one matrix identifier, each disk includes $m^2$ logical blocks, and the n disk groups include $m^2*(m*n)$ logical blocks, where both m and n are positive integers;

generating a third matrix with $m^2$ rows and $m*n$ columns according to a first matrix with 1 row and m columns or a second matrix with m rows and 1 column, where all matrix elements included in the first matrix and the second matrix are matrix identifiers of all RAIDs that are constructed by the n disk groups, the number of matrix identifiers, of each RAID, in matrix elements included in the third matrix is the same, and each matrix element in the third matrix corresponds to a logical block at a same location in the $m^2*(m*n)$ logical blocks in a one-to-one manner; and determining that logical blocks corresponding to matrix elements of a same matrix identifier in the third matrix are one RAID, so that the $m^2*(m*n)$ logical blocks form m RAIDs.

With reference to the first aspect, in a first implementation manner of the first aspect, the generating a third matrix with $m^2$ rows and $m*n$ columns according to a first matrix with 1 row and m columns specifically includes: generating n first matrices; circularly translating a row of matrix elements included in each first matrix towards the left or towards the right for each first matrix, to generate a fourth matrix with m rows and m columns, and forming a fifth matrix with m rows and $m*n$ columns by using n fourth matrices; and generating m fifth matrices, and forming the third matrix with $m^2$ rows and $m*n$ columns by using the m fifth matrices.

With reference to the first implementation manner, in a second implementation manner of the first aspect, where columns in which a same matrix element in the n first matrices is located are the same, or columns in which a same matrix element in the n first matrices is located are different.

With reference to the first implementation manner or the second implementation manner, in a third implementation manner of the first aspect, for each first matrix, the number of columns by which a row of matrix elements in each first matrix is circularly translated towards the left or towards the right is the same or different.

With reference to the first aspect, in a fourth implementation manner of the first aspect, the generating a third matrix with $m^2$ rows and $m*n$ columns according to a second matrix with m rows and 1 column specifically includes: generating n second matrices; circularly translating a column of matrix elements included in each second matrix upward or downward for each second matrix to generate a fourth matrix with m rows and m columns, and forming a fifth matrix with m rows and $m*n$ columns by using n fourth matrices; and generating m fifth matrices, and forming the third matrix with $m^2$ rows and $m*n$ columns by using the m fifth matrices.

With reference to the fourth implementation manner, in a fifth implementation manner of the first aspect, where rows in which a same matrix element in the n second matrices is located are the same, or rows in which a same matrix element in the n second matrices is located are different.

With reference to the fourth implementation manner or the fifth implementation manner, in a sixth implementation manner of the first aspect, for each second matrix, the number of rows by which a column of matrix elements in each second matrix is circularly translated upward or downward is the same or different.

With reference to the first aspect, in a seventh implementation manner of the first aspect, the generating a third matrix with $m^2$ rows and $m*n$ columns according to a first matrix with 1 row and m columns specifically includes: circularly translating a row of matrix elements included in the first matrix towards the left or towards the right to generate a sixth matrix with m rows and m columns; translating each row in the sixth matrix upward or downward to generate $m*n$ seventh matrices; and generating the third matrix with $m^2$ rows and $m*n$ columns by using the $m*n$ seventh matrices.

With reference to the seventh implementation manner, in an eighth implementation manner of the first aspect, each seventh matrix is obtained by translating each row in the sixth matrix upward or downward by the same number of rows or the different number of rows.

With reference to the first aspect, in a ninth implementation manner of the first aspect, the generating a third matrix with $m^2$ rows and $m*n$ columns according to a second matrix with m rows and 1 column specifically includes: circularly translating a column of matrix elements included in the second matrix upward or downward to generate a sixth matrix with m rows and m columns; translating each column in the sixth matrix towards the left or towards the right to generate m*n seventh matrices; and generating the third matrix with $m^2$ rows and m*n columns by using the m*n seventh matrices.

With reference to the ninth implementation manner, in a tenth implementation manner of the first aspect, each seventh matrix is obtained by translating each column in the sixth matrix towards the left or towards the right by the same number of columns or the different number of columns.

With reference to the first aspect, in an eleventh implementation manner of the first aspect, the generating a third matrix with $m^2$ rows and m*n columns according to a first matrix with 1 row and m columns specifically includes: circularly translating a row of matrix elements included in the first matrix towards the left or towards the right to generate an eighth matrix with m rows and m columns; translating each column in the eighth matrix towards the left or towards the right to generate m*n ninth matrices; and generating the third matrix with $m^2$ rows and m*n columns by using the m*n ninth matrices.

With reference to the eleventh implementation manner, in a twelfth implementation manner of the first aspect, each ninth matrix is obtained by translating each column in the eighth matrix towards the left or towards the right by the same number of columns or the different number of columns.

With reference to the first aspect, in a thirteenth implementation manner of the first aspect, the generating a third matrix with $m^2$ rows and m*n columns according to a second matrix with m rows and 1 column specifically includes: circularly translating a column of matrix elements included in the second matrix upward or downward to generate an eighth matrix with m rows and m columns; translating each row in the eighth matrix upward or downward to generate m*n ninth matrices; and generating the third matrix with $m^2$ rows and m*n columns by using the m*n ninth matrices.

With reference to the thirteenth implementation manner, in a fourteenth implementation manner of the first aspect, each ninth matrix is obtained by translating each row in the eighth matrix upward or downward by the same number of rows or the different number of rows.

With reference to the first aspect and any one of the first implementation manner to the fourteenth implementation manner, in a fifteenth implementation manner of the first aspect, after the generating a third matrix with $m^2$ rows and m*n columns according to a first matrix with 1 row and m columns or a second matrix with m rows and 1 column, the method further includes: determining that one logical block in one RAID or one logical block in each RAID is hot spare space, where the hot spare space is used to store and recover data.

According to a second aspect, an embodiment of the present invention provides an apparatus for determining a redundant array of independent disks, including:

a determining module, configured to determine that the number m of disks included in each disk group in n disk groups is the number of redundant arrays of independent disks RAIDs that are constructed by the n disk groups, where each RAID corresponds to one matrix identifier, each disk includes $m^2$ logical blocks, and the n disk groups include $m^2*(m*n)$ logical blocks, where both m and n are positive integers;

a generating module, configured to generate a third matrix with $m^2$ rows and m*n columns according to a first matrix with 1 row and m columns or a second matrix with m rows and 1 column, where all matrix elements included in the first matrix and the second matrix are matrix identifiers of all RAIDs that are constructed by the n disk groups, the number of matrix identifiers, of each RAID, in matrix elements included in the third matrix is the same, and each matrix element in the third matrix corresponds to a logical block at a same location in the $m^2*(m*n)$ logical blocks in a one-to-one manner; and a constructing module, configured to determine that logical blocks corresponding to matrix elements of a same matrix identifier in the third matrix are one RAID, so that the $m^2*(m*n)$ logical blocks form m RAIDs.

With reference to the second aspect, in a first implementation manner of the second aspect, the generating module is specifically configured to: generate n first matrices; circularly translate a row of matrix elements included in each first matrix towards the left or towards the right for each first matrix, to generate a fourth matrix with m rows and m columns, and form a fifth matrix with m rows and m*n columns by using n fourth matrices; and generate m fifth matrices, and form the third matrix with $m^2$ rows and m*n columns by using the m fifth matrices.

With reference to the first implementation manner, in a second implementation manner of the second aspect, columns in which a same matrix element in the n first matrices is located are the same, or columns in which a same matrix element in the n first matrices is located are different.

With reference to the first implementation manner or the second implementation manner, in a third implementation manner of the second aspect, for each first matrix, the number of columns by which a row of matrix elements in each first matrix is circularly translated towards the left or towards the right is the same or different.

With reference to the second aspect, in a fourth implementation manner of the second aspect, the generating module is specifically configured to: generate n second matrices; circularly translate a column of matrix elements included in each second matrix upward or downward for each second matrix to generate a fourth matrix with m rows and m columns, and form a fifth matrix with m rows and m*n columns by using n fourth matrices; and generate m fifth matrices, and form the third matrix with $m^2$ rows and m*n columns by using the m fifth matrices.

With reference to the fourth implementation manner, in a fifth implementation manner of the second aspect, rows in which a same matrix element in the n second matrices is located are the same, or rows in which a same matrix element in the n second matrices is located are different.

With reference to the fourth implementation manner or the fifth implementation manner, in a sixth implementation manner of the second aspect, for each second matrix, the number of rows by which a column of matrix elements in each second matrix is circularly translated upward or downward is the same or different.

With reference to the second aspect, in a seventh implementation manner of the second aspect, the generating module is specifically configured to: circularly translate a row of matrix elements included in the first matrix towards the left or towards the right to generate a sixth matrix with m rows and m columns; translate each row in the sixth matrix upward or downward to generate m*n seventh matrices; and generate the third matrix with $m^2$ rows and m*n columns by using the m*n seventh matrices.

With reference to the seventh implementation manner, in an eighth implementation manner of the second aspect, each seventh matrix is obtained by translating each row in the sixth matrix upward or downward by the same number of rows or the different number of rows.

With reference to the second aspect, in a ninth implementation manner of the second aspect, the generating module is specifically configured to: circularly translate a column of matrix elements included in the second matrix upward or downward to generate a sixth matrix with m rows and m columns; translate each column in the sixth matrix towards the left or towards the right to generate m*n seventh matrices; and generate the third matrix with $m^2$ rows and m*n columns by using the m*n seventh matrices.

With reference to the ninth implementation manner, in a tenth implementation manner of the second aspect, each seventh matrix is obtained by translating each column in the sixth matrix towards the left or towards the right by the same number of columns or the different number of columns.

With reference to the second aspect, in an eleventh implementation manner of the second aspect, the generating module is specifically configured to: circularly translate a row of matrix elements included in the first matrix towards the left or towards the right to generate an eighth matrix with m rows and m columns; translate each column in the eighth matrix towards the left or towards the right to generate m*n ninth matrices; and generate the third matrix with $m^2$ rows and m*n columns by using the m*n ninth matrices.

With reference to the eleventh implementation manner, in a twelfth implementation manner of the second aspect, each ninth matrix is obtained by translating each column in the eighth matrix towards the left or towards the right by the same number of columns or the different number of columns.

With reference to the second aspect, in a thirteenth implementation manner of the second aspect, the generating module is specifically configured to: circularly translate a column of matrix elements included in the second matrix upward or downward to generate an eighth matrix with m rows and m columns; translate each row in the eighth matrix upward or downward to generate m*n ninth matrices; and generate the third matrix with $m^2$ rows and m*n columns by using the m*n ninth matrices.

With reference to the thirteenth implementation manner, in a fourteenth implementation manner of the second aspect, each ninth matrix is obtained by translating each row in the eighth matrix upward or downward by the same number of rows or the different number of rows.

With reference to the second aspect and any one of the first implementation manner to the fourteenth implementation manner, the determining module is further configured to determine that one logical block in one RAID or one logical block in each RAID is hot spare space, where the hot spare space is used to store and recover data.

According to a third aspect, an embodiment of the present invention provides an apparatus for determining a redundant array of independent disks, including a memory and a processor, where the memory and the processor communicate with each other, the memory is configured to store an instruction, and the processor is configured to run the instruction stored in the memory, so as to execute the method for determining a redundant array of independent disks provided in the embodiment of the present invention.

According to the method for determining a redundant array of independent disks provided in the embodiment, for an actual physical disk including n disk groups in which each disk group includes m disks, the n disk groups include $m^2*$(m*n) logical blocks, and a logical block matrix corresponding to m distributed RAIDs can be generated. Therefore, a correspondence between the actual physical disk and the distributed RAIDs can be obtained. In a scenario of data storage or the like, a mapping relationship table of the physical disk and the RAIDs does not need to be stored, thereby saving storage space of a system, reducing maintenance costs, and improving reliability of the system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
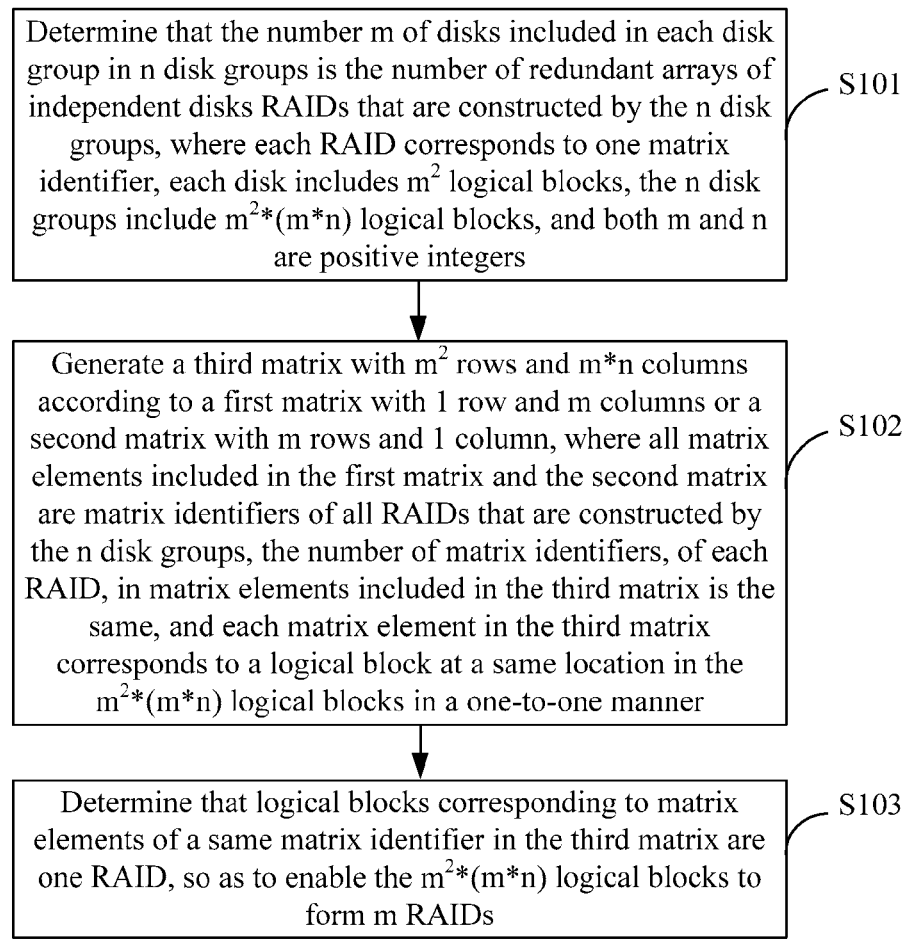
FIG. 1 is a method for determining a redundant array of independent disks according to an embodiment of the present invention.

FIG. 1 is a flowchart of a method for determining a redundant array of independent disks according to an embodiment of the present invention. The method shown in this embodiment may be executed by a processor in various types of terminal devices, for example, a central processing unit CPU, and may also be implemented by using a hardware programmable device, such as a field-programmable gate array (Field-Programmable Gate Array, FPGA), a complex programmable logic device (Complex Programmable Logic Device, CPLD) and an application specific integrated circuit (Application Specific Integrated Circuit, ASIC). The method specifically includes:

S101. Determine that the number m of disks included in each disk group in n disk groups is the number of redundant arrays of independent disks RAIDs that are constructed by the n disk groups, where each RAID corresponds to one matrix identifier, each disk includes $m^2$ logical blocks, and the n disk groups include $m^2*$(m*n) logical blocks, where both m and n are positive integers.

S102. Generate a third matrix with $m^2$ rows and m*n columns according to a first matrix with 1 row and m columns or a second matrix with m rows and 1 column, where all matrix elements included in the first matrix and the second matrix are matrix identifiers of all RAIDs that are constructed by the n disk groups, the number of matrix identifiers, of each RAID, in matrix elements included in the third matrix is the same, and each matrix element in the third matrix corresponds to a logical block at a same location in the $m^2*(m*n)$ logical blocks in a one-to-one manner.

S103. Determine that logical blocks corresponding to matrix elements of a same matrix identifier in the third matrix are one RAID, so that the $m^2*(m*n)$ logical blocks form m RAIDs.

The method for determining a redundant array of independent disks provided in this embodiment of the present invention is applicable to various implementation scenarios. In a typical implementation scenario, when data needs to be stored in a terminal device, for example, when a document or a film need to be stored, a CPU in the terminal device may store data of the foregoing files into distributed RAIDs. In this way, after a disk in a system is damaged, data stored in the damaged disk can still be recovered. However, when storing data, the CPU needs to be informed of a correspondence between an actual physical disk and "logical blocks" included in the distributed RAIDs. Therefore, the CPU may execute operations of the foregoing S101-S103 to determine the correspondence between the actual physical disk and the "logical blocks" included in the distributed RAIDs.

Specifically, if the actual physical disk includes n disk groups, and each disk group includes m disks, the number of RAIDs that can be constructed by the n disk groups is also n. The n RAIDs are constructed in a distributed manner on the actual physical disk formed by the n disk groups. If each disk includes $m^2$ logical blocks, the n disk groups may include $m^2*(m*n)$ logical blocks.

By using the method provided in this embodiment of the present invention, a correspondence between the actual physical disk including the $m^2*(m*n)$ logical blocks and the distributed RAIDs.

Specifically, because each disk group includes m disks, a first matrix with 1 row and m columns or a second matrix with m rows and 1 column may be constructed first, where all matrix elements included in the first matrix and the second matrix are matrix identifiers of all RAIDs that are constructed by the n disk groups. For example, if each disk group includes 3 disks, the number of the RAIDs that are constructed by the n disk groups is 3. Assuming that matrix identifiers corresponding to the 3 RAIDs are a, b, and c separately, the first matrix may be (a b c), and the second matrix may be $$\begin{pmatrix} a \\ b \\ c \end{pmatrix}.$$

It may be understood that, columns in which a, b, and c are located in the first matrix are not limited. Likewise, rows in which a, b, and c are located in the second matrix are also not limited.

A third matrix with $m^2$ rows and m*n columns may be generated by using the first matrix or the second matrix.

In a first method for generating the third matrix, as a feasible implementation manner, the third matrix with $m^2$ rows and m*n columns may be generated according to the first matrix with 1 row and m columns, which is specifically that:

Because the actual physical disk includes n disk groups, n first matrices may be generated, where columns in which a same matrix element in the n first matrices is located may be the same or different.

For each first matrix, a row of matrix elements included in each first matrix may be circularly translated towards the left or towards the right to generate a fourth matrix with m rows and m columns. That a row of matrix elements is circularly translated by one column is used as an example: that a row of matrix elements is circularly translated towards the left by one column refers to that: each matrix element in the row is separately translated towards the left by one column, and the first column of elements of the row is "circularly" translated to the last column of the row. Likewise, that a row of matrix elements is circularly translated towards the right by one column refers to that: each matrix element in the row is separately translated towards the right by one column, and the last column of elements of the row is "circularly" translated to the first column of the row. For each first matrix, the number of columns by which a row of matrix elements in each first matrix is circularly translated towards the left or towards the right may be the same or different.

A fifth matrix with m rows and m*n columns is formed by using n fourth matrices, then m fifth matrices are generated, and the third matrix with $m^2$ rows and m*n columns is formed by using the m fifth matrices. A location of each fourth matrix in the fifth matrix is not limited. Likewise, a location of each fifth matrix in the third matrix is not limited either.

As another feasible implementation manner of the first method, the third matrix with $m^2$ rows and m*n columns may further be generated according to the second matrix with m rows and 1 column, which is specifically that:

Because the actual physical disk includes n disk groups, n second matrices are generated. Similarly, rows in which a same matrix element in the n second matrices is located may be the same or different.

For each second matrix, a column of matrix elements included in each second matrix is circularly translated upward or downward to generate a fourth matrix with m rows and m columns. That a column of matrix elements is circularly translated by one row is used as an example: that a column of matrix elements is circularly translated upward by one row refers to that: each matrix element in the column is separately translated upward by one row, and the first row of elements of the column is "circularly" translated to the last row of the column. Likewise, that a column of matrix elements is circularly translated downward by one row refers to that: each matrix element in the column is separately translated downward by one row, and the last row of elements of the column is "circularly" translated to the first row of the column. For each second matrix, the number of rows by which a column of matrix elements in each second matrix is circularly translated upward or downward may be the same or different.

A fifth matrix with m rows and m*n columns is formed by using n fourth matrices, m fifth matrices are generated, and the third matrix with $m^2$ rows and m*n columns is formed by using the m fifth matrices. A location of each fourth matrix in the fifth matrix is not limited. Likewise, a location of each fifth matrix in the third matrix is also not limited.

In a second method for generating the third matrix, as a feasible implementation manner, the third matrix with $m^2$ rows and m*n columns may be generated according to the first matrix with 1 row and m columns, which is specifically that:

A row of matrix elements included in the first matrix may be circularly translated towards the left or towards the right to generate a sixth matrix with m rows and m columns. For details about circularly translating a row of matrix elements towards the left or towards the right, reference may be made to the related description in the foregoing first method.

Each row in the sixth matrix is translated upward or downward to generate m*n seventh matrices. That each row in the sixth matrix is translated upward by one row is used as an example. Each row is entirely translated upward by one row, and the first row of elements is entirely and "circularly" translated to the last row of the matrix. Then, that each row in the sixth matrix is translated downward by one row is used as an example. Each row is entirely translated downward by one row, and the last row of elements is entirely and "circularly" translated to the first row of the matrix. Each seventh matrix may be obtained by translating each row in the sixth matrix upward or downward by the same number of rows or the different number of rows.

The third matrix with $m^2$ rows and m*n columns is generated by using the m*n seventh matrices. A location of the seventh matrix in the third matrix is not limited.

As another feasible implementation manner of the second method, the third matrix with $m^2$ rows and m*n columns may be generated according to the second matrix with m rows and 1 column, which is specifically that:

A column of matrix elements included in the second matrix is circularly translated upward or downward to generate a sixth matrix with m rows and m columns. For details about circularly translating a column of matrix elements upward or downward, reference may be made to the related description in the foregoing first method.

Each column in the sixth matrix is translated towards the left or towards the right to generate m*n seventh matrices. That each column in the sixth matrix is translated towards the left by one column is used as an example. Each column is entirely translated towards the left by one column, and the first column of elements is entirely and "circularly" translated to the last column of the matrix. Then, each column in the sixth matrix is translated towards the right by one column is used as an example. Each column is entirely translated towards the right by one column, and the last column of elements is entirely and "circularly" translated to the first column of the matrix. Each seventh matrix may be obtained by translating each column in the sixth matrix towards the left or towards the right by the same number of columns or the different number of columns.

The third matrix with $m^2$ rows and m*n columns is generated by using the m*n seventh matrices. A location of the seventh matrix in the third matrix is not limited.

In a third method for generating the third matrix, as a feasible implementation manner, the third matrix with $m^2$ rows and m*n columns may be generated according to the first matrix with 1 row and m columns, which is specifically that:

A row of matrix elements included in the first matrix is circularly translated towards the left or towards the right to generate an eighth matrix with m rows and m columns. For details about circularly translating a row of matrix elements towards the left or towards the right, reference may be made to the related description in the foregoing first method.

Each column in the eighth matrix is translated towards the left or towards the right to generate m*n ninth matrices. That each column in the eighth matrix is translated towards the left by one column is used as an example. Each column is entirely translated towards the left by one column, and the first column of elements is entirely and "circularly" translated to the last column of the matrix. Then, each column in the eighth matrix is translated towards the right by one column is used as an example. Each column is entirely translated towards the right by one column, and the last column of elements is entirely and "circularly" translated to the first column of the matrix. Each ninth matrix may be obtained by translating each column in the eighth matrix towards the left or towards the right by the same number of columns or the different number of columns.

The third matrix with $m^2$ rows and m*n columns is generated by using the m*n ninth matrices. A location of the ninth matrix in the third matrix is not limited.

As another feasible implementation manner of the third method, the third matrix with $m^2$ rows and m*n columns may be generated according to the second matrix with m rows and 1 column, which is specifically that:

A column of matrix elements included in the second matrix is circularly translated upward or downward to generate an eighth matrix with m rows and m columns. For details about circularly translating a column of matrix elements upward or downward, reference may be made to the related description in the foregoing first method.

Each row in the eighth matrix is translated upward or downward to generate m*n ninth matrices. That each row in the eighth matrix is translated upward by one row is used as an example. Each row is entirely translated upward by one row, and the first row of elements is entirely and "circularly" translated to the last row of the matrix. Then, that each row in the eighth matrix is translated downward by one row is used as an example. Each row is entirely translated downward by one row, and the last row of elements is entirely and "circularly" translated to the first row of the matrix. Each ninth matrix may be obtained by translating each row in the eighth matrix upward or downward by the same number of rows or the different number of rows.

The third matrix with $m^2$ rows and m*n columns is generated by using the m*n ninth matrices. A location of the ninth matrix in the third matrix is not limited.

On the basis of the foregoing implementation manners, optionally, after the third matrix is determined, it may further be determined that one logical block in one RAID or one logical block in each RAID is hot spare space, where the hot spare space does not store data when an actual physical disk works normally, but is used to store recovered data after a data recovery operation is performed when a disk is damaged.

After the third matrix is determined, it may be determined that logical blocks corresponding to matrix elements of a same matrix identifier in the third matrix are one RAID. Therefore, $m^2*(m*n)$ logical blocks included in the actual physical disk form m distributed RAIDs.

According to the method for determining a redundant array of independent disks provided in the embodiment, for an actual physical disk including n disk groups in which each disk group includes m disks, the n disk groups include $m^2*(m*n)$ logical blocks, and a logical block matrix corresponding to m distributed RAIDs can be generated. Therefore, a correspondence between the actual physical disk and the distributed RAIDs can be obtained. In a scenario of data storage or the like, a mapping relationship table of the physical disk and the RAIDs does not need to be stored, thereby saving storage space of a system, reducing maintenance costs, and improving reliability of the system.

Figure 2:
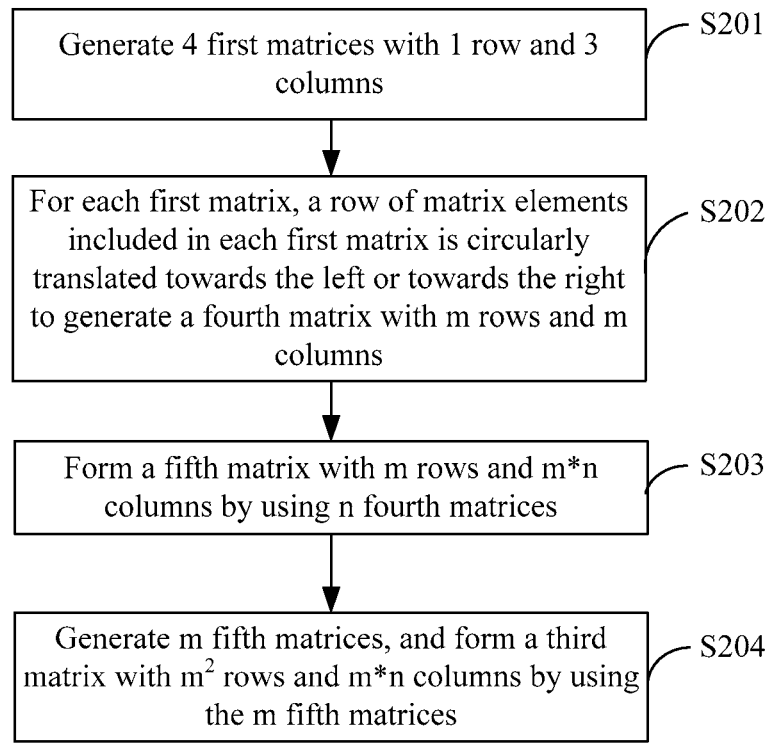
FIG. 2 is a flowchart of a method for determining a third matrix according to an embodiment of the present invention.

The following uses a specific example to describe in detail a specific process of generating the third matrix with $m^2$ rows and m*n columns according to a first matrix with 1 row and m columns in the first method used for determining the third matrix in the embodiment shown in FIG. 1. As shown in FIG. 2, an actual physical disk includes 4 disk groups, that is, n=4, and each disk group includes 3 disks, that is, m=3, so that the actual physical disk may construct 3 RAIDs, and matrix identifiers of the 3 RAIDs are represented by a, b, and c separately. The generating the third matrix with m² rows and m*n columns according to a first matrix with 1 row and m columns may specifically include the following steps:

S201. Generate 4 first matrices with 1 row and 3 columns:
(a b c) (a b c) (a b c) (a b c)

In this embodiment, columns in which a same matrix element in each of the foregoing first matrices is located are the same, but it may be understood that, columns in which a same matrix element is located may also be different, for example, the foregoing first matrix may also be (a c b), (b c a), or the like.

S202. For each first matrix, a row of matrix elements included in each first matrix may be circularly translated towards the left or towards the right to generate a fourth matrix with m rows and m columns.

For example, if each matrix element in (a b c) is translated towards the left by 0 column to obtain the first row to the third row of the fourth matrix, an obtained fourth matrix is $$\begin{pmatrix} a & b & c \\ a & b & c \\ a & b & c \end{pmatrix}.$$

If each matrix element in (a b c) is translated towards the left by 1 column to obtain the second row of the fourth matrix, and is translated towards the left by 2 columns to obtain the third row of the fourth matrix, an obtained fourth matrix is $$\begin{pmatrix} a & b & c \\ b & c & a \\ c & a & b \end{pmatrix}.$$

If each matrix element in (a b c) is translated towards the left by 2 columns to obtain the second row of the fourth matrix, and is translated towards the left by 1 column to obtain the third row of the fourth matrix, an obtained fourth matrix is $$\begin{pmatrix} a & b & c \\ c & a & b \\ b & c & a \end{pmatrix}.$$

It should be noted that, that elements in each first matrix are translated towards the left or translated towards the right, and the number of columns for translating are not limited.

S203. Form a fifth matrix with m rows and m*n columns by using n fourth matrices.

For example, after the 4 first matrices are obtained in the foregoing, each first matrix may separately generate one fourth matrix. As shown in the following, these fourth matrices may form one fifth matrix.

$$\begin{pmatrix} a & b & c \\ a & b & c \\ a & b & c \end{pmatrix} \begin{pmatrix} a & b & c \\ b & c & a \\ c & a & b \end{pmatrix} \begin{pmatrix} a & b & c \\ c & a & b \\ b & c & a \end{pmatrix} \begin{pmatrix} a & b & c \\ b & c & a \\ c & a & b \end{pmatrix}$$

S204. Generate m fifth matrices, and form the third matrix with m² rows and m*n columns by using the m fifth matrices.

It should be noted that, the generated m fifth matrices may be the same, and may also be different, and the m fifth matrices may construct one third matrix, as shown in the following:

$$\begin{pmatrix} b & c & a & b & c & a & b & c & a & b & c & a \\ b & c & a & c & a & b & a & b & c & a & b & c \\ b & c & a & a & b & c & c & a & b & c & a & b \\ c & a & b & c & a & b & c & a & b & c & a & b \\ c & a & b & a & b & c & b & c & a & b & c & a \\ c & a & b & b & c & a & a & b & c & a & b & c \\ a & b & c & a & b & c & a & b & c & a & b & c \\ a & b & c & b & c & a & c & a & b & b & c & a \\ a & b & c & c & a & b & b & c & a & c & a & b \end{pmatrix}$$

A manner of generating a third matrix with m² rows and m*n columns according to a second matrix with m rows and 1 column is similar to the foregoing process. A difference only lies in that: in S201, n second matrices are generated; and in S202, for each second matrix, a column of matrix elements included in each second matrix is circularly translated upward or downward to generate a fourth matrix with m rows and m columns, and a fifth matrix with m rows and m*n columns is formed by using n fourth matrices.

As can be seen from the foregoing matrix, for each RAID in obtained distributed RAIDs, because the number of the disk groups is 4, each stripe (stripe, that is, one row in the third matrix) in each RAID includes 4 logical blocks. It may be understood that if the number of the disk groups is 3, each stripe (one row) in each RAID includes 3 logical blocks. Each RAID is evenly distributed in each disk. Therefore, for a to-be-stored file, data may be stored in a RAID, and the RAID is stored on each physical disk in a distributed manner. Therefore, a case in which a hotspot hard disk appears is effectively avoided, that is, that data is stored in a physical hard disk in a concentrated manner is avoided.

According to the method for determining a redundant array of independent disks provided in the embodiment, in a process of generating a logical block matrix corresponding to m distributed RAIDs, a third matrix with m² rows and m*n columns may be generated according to a first matrix formed by m matrix identifiers. In this way, it may be determined that logical blocks having a same matrix identifier in the third matrix are one RAID. Therefore, a correspondence between an actual physical disk and the distributed RAIDs can be obtained by using the foregoing method. In a scenario of data storage or the like, a mapping relationship table of the physical disk and the RAIDs does not need to be stored, thereby saving storage space of a system, reducing maintenance costs, and improving reliability of the system.

Figure 3:
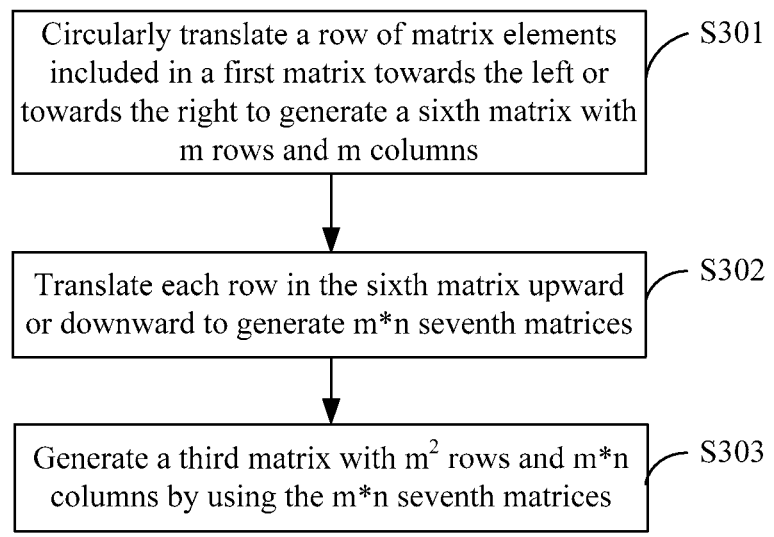
FIG. 3 is a flowchart of a method for determining a third matrix according to another embodiment of the present invention.

The following uses a specific example to describe in detail a specific process of generating the third matrix with m² rows and m*n columns according to a first matrix with 1 row and m columns in the second method used for determining the third matrix in the embodiment shown in FIG. 1. As shown in FIG. 3, an actual physical disk includes 3 disk groups, that is, n=3, and each disk group includes 3 disks, that is, m=3, so that the actual physical disk may construct 3 RAIDs, and matrix identifiers of the 3 RAIDs are represented by 1, 2, and 3 separately. The generating the third matrix with m² rows and m*n columns according to a first matrix with 1 row and m columns may specifically include the following steps:

S301. Circularly translate a row of matrix elements included in the first matrix towards the left or towards the right to generate a sixth matrix with m rows and m columns.

The first matrix may be (1 2 3), and may also be (1 3 2), (2 3 1), or the like.

For example, if each matrix element in (1 2 3) is translated towards the left by 0 column to obtain the first row to the third row of the sixth matrix, an obtained sixth matrix is $$\begin{pmatrix} 1 & 2 & 3 \\ 1 & 2 & 3 \\ 1 & 2 & 3 \end{pmatrix}.$$

If each matrix element in (1 2 3) is translated towards the left by 1 column to obtain the second row of the sixth matrix, and is translated towards the left by 2 columns to obtain the third row of the sixth matrix, an obtained sixth matrix is $$\begin{pmatrix} 1 & 2 & 3 \\ 2 & 3 & 1 \\ 3 & 1 & 2 \end{pmatrix}.$$

If each matrix element in (1 2 3) is translated towards the left by 2 columns to obtain the second row of the sixth matrix, and is translated towards the left by 1 column to obtain the third row of the sixth matrix, an obtained sixth matrix is $$\begin{pmatrix} 1 & 2 & 3 \\ 3 & 1 & 2 \\ 2 & 3 & 1 \end{pmatrix}.$$

It should be noted that, that elements in each first matrix are translated towards the left or translated towards the right, and the number of columns for translating are not limited.

S302. Translate each row in the sixth matrix upward or downward to generate m*n seventh matrices.

A difference between this embodiment and the foregoing embodiment lies in that, after the sixth matrix is obtained by using the first matrix, each row in the sixth matrix is entirely translated upward or downward to generate the seventh matrix.

For example, for a sixth matrix $$\begin{pmatrix} 1 & 2 & 3 \\ 2 & 3 & 1 \\ 3 & 1 & 2 \end{pmatrix},$$

if each row is entirely translated downward by one row, an obtained seventh matrix is $$\begin{pmatrix} 3 & 1 & 2 \\ 1 & 2 & 3 \\ 2 & 3 & 1 \end{pmatrix}.$$

For a sixth matrix $$\begin{pmatrix} 1 & 2 & 3 \\ 3 & 1 & 2 \\ 2 & 3 & 1 \end{pmatrix},$$

if each row is entirely translated upward by one row, an obtained seventh matrix is $$\begin{pmatrix} 3 & 1 & 2 \\ 2 & 3 & 1 \\ 1 & 2 & 3 \end{pmatrix}.$$

It should be noted that, that elements of each row in each sixth matrix are entirely translated upward or translated downward, and the number of rows for translating are not limited.

S303. Generate a third matrix with $m^2$ rows and m*n columns by using the m*n seventh matrices.

In a process of generating the third matrix with $m^2$ rows and m*n columns by using the foregoing m*n seventh matrices, a location of each seventh matrix in the third matrix is not limited, which, for example, may be shown in the following:

$$\begin{pmatrix} 1 & 2 & 3 & 1 & 2 & 3 & 1 & 2 & 3 \\ 1 & 2 & 3 & 2 & 3 & 1 & 3 & 1 & 2 \\ 1 & 2 & 3 & 3 & 1 & 2 & 2 & 3 & 1 \\ 2 & 3 & 1 & 2 & 3 & 1 & 2 & 3 & 1 \\ 2 & 3 & 1 & 3 & 1 & 2 & 1 & 2 & 3 \\ 2 & 3 & 1 & 1 & 2 & 3 & 3 & 1 & 2 \\ 3 & 1 & 2 & 3 & 1 & 2 & 3 & 1 & 2 \\ 3 & 1 & 2 & 1 & 2 & 3 & 2 & 3 & 1 \\ 3 & 1 & 2 & 2 & 3 & 1 & 1 & 2 & 3 \end{pmatrix}$$

A manner of generating a third matrix with $m^2$ rows and m*n columns according to a second matrix with m rows and 1 column is similar to the foregoing process. A difference only lies in that: in S301, a column of matrix elements included in the second matrix is circularly translated upward or downward to generate a sixth matrix with m rows and m columns; and in S302, each column in the sixth matrix is translated towards the left or towards the right to generate m*n seventh matrices.

As can be seen from the foregoing matrix, for each RAID in obtained distributed RAIDs, because the number of the disk groups is 3, each stripe (one row) in each RAID includes 3 logical blocks. It may be understood that if the number of the disk groups is 3, each stripe (one row) in each RAID includes 3 logical blocks. Each RAID is evenly distributed in each disk. Therefore, for a to-be-stored file, data may be stored in a RAID, and the RAID is stored on each physical disk in a distributed manner. Therefore, a case in which a hotspot hard disk appears is effectively avoided, that is, that data is stored in a physical hard disk in a concentrated manner is avoided.

According to the method for determining a redundant array of independent disks provided in the embodiment, in a process of generating a logical block matrix corresponding to m distributed RAIDs, a third matrix with $m^2$ rows and m*n columns may be generated according to a first matrix formed by m matrix identifiers. In this way, it may be determined that logical blocks having a same matrix identifier in the third matrix are one RAID. Therefore, a correspondence between an actual physical disk and the distributed RAIDs can be obtained by using the foregoing method. In a scenario of data storage or the like, a mapping relationship table of the physical disk and the RAIDs does not need to be stored, thereby saving storage space of a system, reducing maintenance costs, and improving reliability of the system.

Figure 4:
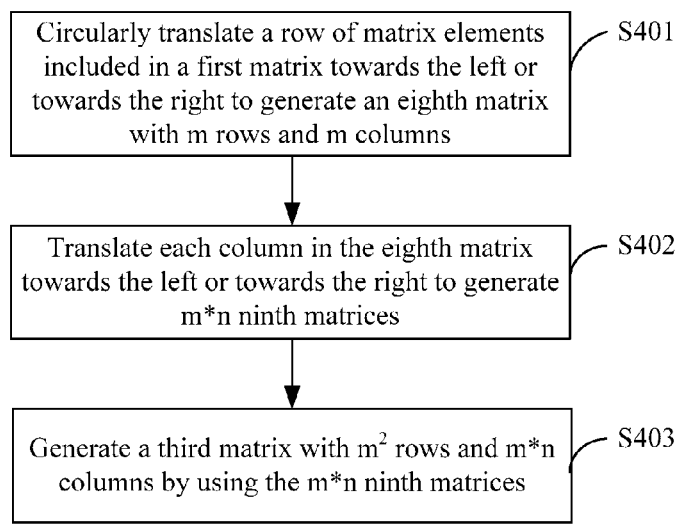
FIG. 4 is a flowchart of a method for determining a third matrix according to still another embodiment of the present invention.

The following uses a specific example to describe in detail a specific process of generating the third matrix with $m^2$ rows and $m*n$ columns according to a first matrix with 1 row and m columns in the third method used for determining the third matrix in the embodiment shown in FIG. 1. As shown in FIG. 4, an actual physical disk includes 3 disk groups, that is, n=3, and each disk group includes 3 disks, that is, m=3, so that the actual physical disk may construct 3 RAIDs, and matrix identifiers of the 3 RAIDs are represented by 1, 2, and 3 separately. The generating the third matrix with $m^2$ rows and $m*n$ columns according to a first matrix with 1 row and m columns may specifically include the following steps:

S401. Circularly translate a row of matrix elements included in the first matrix towards the left or towards the right to generate an eighth matrix with m rows and m columns.

The process is similar to circularly translating a row of matrix elements included in the first matrix towards the left or towards the right to generate a sixth matrix with m rows and m columns in S301. For details, reference may be made to the related description in S301, and details are not described herein again.

S402. Translate each column in the eighth matrix towards the left or towards the right to generate $m*n$ ninth matrices.

After the eighth matrix is obtained by using the first matrix, each row in the eighth matrix is entirely translated upward or downward to generate the ninth matrix.

For example, for an eighth matrix $$\begin{pmatrix} 1 & 2 & 3 \\ 2 & 3 & 1 \\ 3 & 1 & 2 \end{pmatrix},$$

if each column is entirely translated towards the right by one column, an obtained ninth matrix is $$\begin{pmatrix} 3 & 1 & 2 \\ 1 & 2 & 3 \\ 2 & 3 & 1 \end{pmatrix}.$$

For an eighth matrix $$\begin{pmatrix} 1 & 2 & 3 \\ 3 & 1 & 2 \\ 2 & 3 & 1 \end{pmatrix},$$

if each column is entirely translated towards the left by one column, an obtained ninth matrix is $$\begin{pmatrix} 2 & 3 & 1 \\ 1 & 2 & 3 \\ 3 & 1 & 2 \end{pmatrix}.$$

It should be noted that, that elements of each row in each eighth matrix are entirely translated upward or translated downward, and the number of rows for translating are not limited.

S403. Generate a third matrix with $m^2$ rows and $m*n$ columns by using the $m*n$ ninth matrices.

In a process of generating the third matrix with $m^2$ rows and $m*n$ columns by using the foregoing $m*n$ ninth matrices, a location of each ninth matrix in the third matrix is not limited, which, for example, may be shown in the following:

$$\begin{pmatrix} 1 & 2 & 3 & 1 & 2 & 3 & 1 & 2 & 3 \\ 2 & 3 & 1 & 2 & 3 & 1 & 2 & 3 & 1 \\ 3 & 1 & 2 & 3 & 1 & 2 & 3 & 1 & 2 \\ 1 & 2 & 3 & 2 & 3 & 1 & 3 & 1 & 2 \\ 2 & 3 & 1 & 3 & 1 & 2 & 1 & 2 & 3 \\ 3 & 1 & 2 & 1 & 2 & 3 & 2 & 3 & 1 \\ 1 & 2 & 3 & 3 & 1 & 2 & 2 & 3 & 1 \\ 2 & 3 & 1 & 1 & 2 & 3 & 3 & 1 & 2 \\ 3 & 1 & 2 & 2 & 3 & 1 & 1 & 2 & 3 \end{pmatrix}$$

A manner of generating a third matrix with $m^2$ rows and $m*n$ columns according to a second matrix with m rows and 1 column is similar to the foregoing process. A difference only lies in that: in S401, a row of matrix elements included in the first matrix is circularly translated towards the left or towards the right to generate an eighth matrix with m rows and m columns; and in S402, each column in the eighth matrix is translated towards the left or towards the right to generate $m*n$ ninth matrices.

As can be seen from the foregoing matrix, for each RAID in obtained distributed RAIDs, because the number of the disk groups is 3, each stripe (one row) in each RAID includes 3 logical blocks. It may be understood that if the number of the disk groups is 3, each stripe (one row) in each RAID includes 3 logical blocks. Each RAID is evenly distributed in each disk. Therefore, for a to-be-stored file, data may be stored in a RAID, and the RAID is stored on each physical disk in a distributed manner. Therefore, a case in which a hotspot hard disk appears is effectively avoided, that is, that data is stored in a physical hard disk in a concentrated manner is avoided.

According to the method for determining a redundant array of independent disks provided in the embodiment, in a process of generating a logical block matrix corresponding to m distributed RAIDs, a third matrix with $m^2$ rows and $m*n$ columns may be generated according to a first matrix formed by m matrix identifiers. In this way, it may be determined that logical blocks having a same matrix identifier in the third matrix are one RAID. Therefore, a correspondence between an actual physical disk and the distributed RAIDs can be obtained by using the foregoing method. In a scenario of data storage or the like, a mapping relationship table of the physical disk and the RAIDs does not need to be stored, thereby saving storage space of a system, reducing maintenance costs, and improving reliability of the system.

Figure 5:
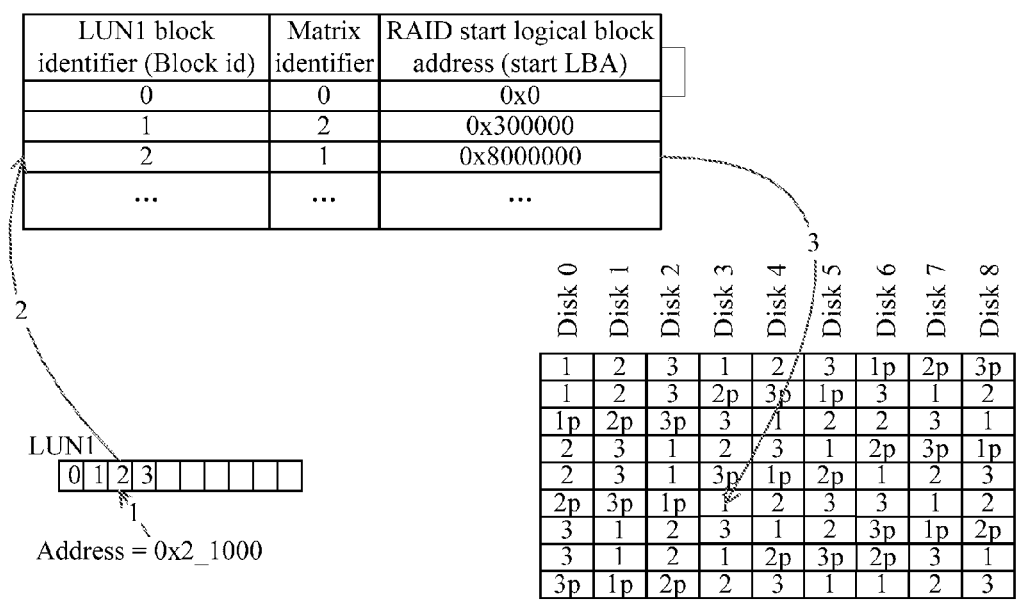
FIG. 5 is a schematic diagram of read data according to an embodiment of the present invention.

By using the RAID established in the foregoing embodiment, an existing manner may be used for reading when data is read. Referring to FIG. 5, for example, in the first step, data in an address Address=0x2_1000 is read, where 2 represents a logical block identifier with a logical unit number (Logical Unit Number, LUN) of LUN1, and 1000 is an address of to-be-read data in the LUN1.

In the second step, by means of a relationship table of an LUN1 block identifier, a matrix identifier, and a start LBA (logical block address) identifier of a RAID, it may be obtained that a matrix identifier corresponding to an LUN1 block 2 is 1, and that a start LBA of the RAID corresponding to the LUN1 block 2 is 0x8000000.

In the third step, it is assumed that in the RAID, each stripe (stripe) includes 2 data units (data unit) and 1 parity unit (parity unit). For example, in a RAID with a matrix identifier of 1 shown in FIG. 5, a stripe corresponding to the first row includes 2 "1" and 1 "1P". The parity unit may also be called as a checking unit, and the unit does not occupy an address space. One data unit (unit) corresponds to one logical block, and an address space occupied by the data unit is 32 k, which equals to a length or a size of one logical block. Therefore, an address space occupied by one stripe=2×32 k=64 k.

Then, if the foregoing third matrix is a matrix with 9 rows and 9 columns, the foregoing third matrix includes 9 stripes of 3 RAIDs, where a size of an address space occupied by the RAID with a matrix identifier of 1 is 9×64 k=576 k. Among matrix identifiers corresponding to logical blocks in a disk 0 to a disk 8 in FIG. 5, 1P, 2P and 3P are parity units in a RAID 1, a RAID 2 and a RAID 3 respectively.

Then 0x8001000/576 k=134221824/(576× 1024)=227.5625; if numbers of RAIDs starts from 0, 0x8001000 should be in the 227$^{th}$ RAID, and a specific location is:

0x8001000-576 k×227=134221824-(576×1024)× 227=324 k, that is, an offset of 0x8001000 in the 227$^{th}$ RAID is 324 k.

In addition, 324 k/64 k=5.0625>5, that is, 0x8001000 is in the 6$^{th}$ stripe in the 227$^{th}$ RAID, and 324 k−5×64 k=4 k, that is, 0x8001000 is in the 1$^{st}$ data unit of the 6$^{th}$ stripe in the 227$^{th}$ RAID.

In this way, an LBA 0x8001000 in a disk 6 is accessed eventually and data is read from an address space of a found data unit. Certainly, a write operation is similar, and data may be written into the address space of the found data unit.

Further, it may be determined that one logical block in one RAID or one logical block in each RAID is hot spare space, where the hot spare space is used to store and recover data.

Figures 6, 7:
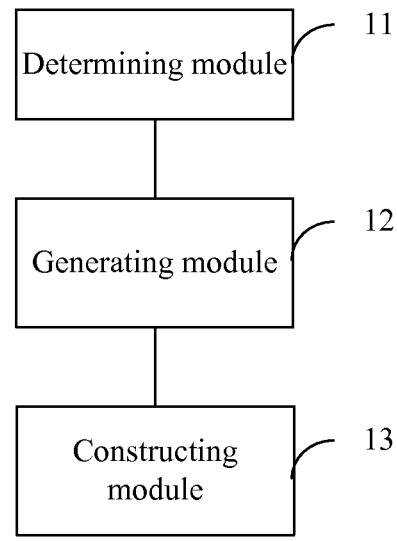
FIG. 6 is a schematic diagram of a global hot spare of a RAID according to the present invention.
FIG. 7 is a schematic structural diagram of an apparatus for determining a redundant array of independent disks according to an embodiment of the present invention.

For example, if there is a global hot spare, 1 logical block in each stripe in a RAID may be used as hot spare space. In a stripe (stripe) in the RAID, the number of logical blocks is 1 less than the number of logical blocks in a stripe in another logical array. As shown in FIG. 6, 1 logical block (that is, a black block in FIG. 6) in each stripe in a RAID 1 is used as hot spare space.

If there is a local hot spare, 1 logical block in each stripe in each RAID may be used as hot spare space. In all stripes (stripes), 1 is subtracted from the number of stripe units (stripe units).

FIG. 7 is a schematic structural diagram of an apparatus for determining a redundant array of independent disks according to an embodiment of the present invention. As shown in FIG. 7, the apparatus includes:

a determining module 11, configured to determine that the number m of disks included in each disk group in n disk groups is the number of redundant arrays of independent disks RAIDs that are constructed by the n disk groups, where each RAID corresponds to one matrix identifier, each disk includes $m^2$ logical blocks, and the n disk groups include $m^2*(m*n)$ logical blocks, where both m and n are positive integers;

a generating module 12, configured to generate a third matrix with $m^2$ rows and m*n columns according to a first matrix with 1 row and m columns or a second matrix with m rows and 1 column, where all matrix elements included in the first matrix and the second matrix are matrix identifiers of all RAIDs that are constructed by the n disk groups, the number of matrix identifiers, of each RAID, in matrix elements included in the third matrix is the same, and each matrix element in the third matrix corresponds to a logical block at a same location in the $m^2*(m*n)$ logical blocks in a one-to-one manner; and a constructing module 13, configured to determine that logical blocks corresponding to matrix elements of a same matrix identifier in the third matrix are one RAID, so that the $m^2*(m*n)$ logical blocks form m RAIDs.

Optionally, the generating module 12 may be specifically configured to: generate n first matrices; circularly translate a row of matrix elements included in each first matrix towards the left or towards the right for each first matrix, to generate a fourth matrix with m rows and m columns, and form a fifth matrix with m rows and m*n columns by using n fourth matrices; and generate m fifth matrices, and form the third matrix with $m^2$ rows and m*n columns by using the m fifth matrices.

Optionally, columns in which a same matrix element in the n first matrices is located are the same, or columns in which a same matrix element in the n first matrices is located are different.

Optionally, for each first matrix, the number of columns by which a row of matrix elements in each first matrix is circularly translated towards the left or towards the right is the same or different.

Optionally, the generating module 12 may be specifically configured to: generate n second matrices; circularly translate a column of matrix elements included in each second matrix upward or downward for each second matrix, to generate a fourth matrix with m rows and m columns, and form a fifth matrix with m rows and m*n columns by using n fourth matrices; and generate m fifth matrices, and form the third matrix with $m^2$ rows and m*n columns by using the m fifth matrices.

Optionally, rows in which a same matrix element in the n second matrices is located are the same, or rows in which a same matrix element in the n second matrices is located are different.

Optionally, for each second matrix, the number of rows by which a column of matrix elements in each second matrix is circularly translated upward or downward is the same or different.

Optionally, the generating module 12 may be specifically configured to: circularly translate a row of matrix elements included in the first matrix towards the left or towards the right to generate a sixth matrix with m rows and m columns; translate each row in the sixth matrix upward or downward to generate m*n seventh matrices; and generate the third matrix with $m^2$ rows and m*n columns by using the m*n seventh matrices.

Optionally, each seventh matrix is obtained by translating each row in the sixth matrix upward or downward by the same number of rows or the different number of rows.

Optionally, the generating module 12 may be specifically configured to: circularly translate a column of matrix elements included in the second matrix upward or downward to generate a sixth matrix with m rows and m columns; translate each column in the sixth matrix towards the left or towards the right to generate m*n seventh matrices; and generate the third matrix with $m^2$ rows and m*n columns by using the m*n seventh matrices.

Optionally, each seventh matrix is obtained by translating each column in the sixth matrix towards the left or towards the right for the same number of columns or the different number of columns.

Optionally, the generating module 12 may be specifically configured to: circularly translate a row of matrix elements included in the first matrix towards the left or towards the right to generate an eighth matrix with m rows and m columns; translate each column in the eighth matrix towards the left or towards the right to generate m*n ninth matrices; and generate the third matrix with $m^2$ rows and m*n columns by using the m*n ninth matrices.

Optionally, each ninth matrix is obtained by translating each column in the eighth matrix towards the left or towards the right by the same number of columns or the different number of columns.

Optionally, the generating module 12 may be specifically configured to: circularly translate a column of matrix elements included in the second matrix upward or downward to generate an eighth matrix with m rows and m columns; translate each row in the eighth matrix upward or downward to generate m*n ninth matrices; and generate the third matrix with $m^2$ rows and m*n columns by using the m*n ninth matrices.

Optionally, each ninth matrix is obtained by translating each row in the eighth matrix upward or downward by the same number of rows or the different number of rows.

Optionally, the determining module 11 may further be configured to determine that one logical block in one RAID or one logical block in each RAID is hot spare space, where the hot spare space is used to store and recover data.

The apparatus for determining a redundant array of independent disks provided in this embodiment corresponds to the method for determining a redundant array of independent disks provided in the present invention, and is an executing device for the method. For its specific executing process and effect, reference may be made to the related description of the method embodiment, and details are not described herein again.

Figure 8:
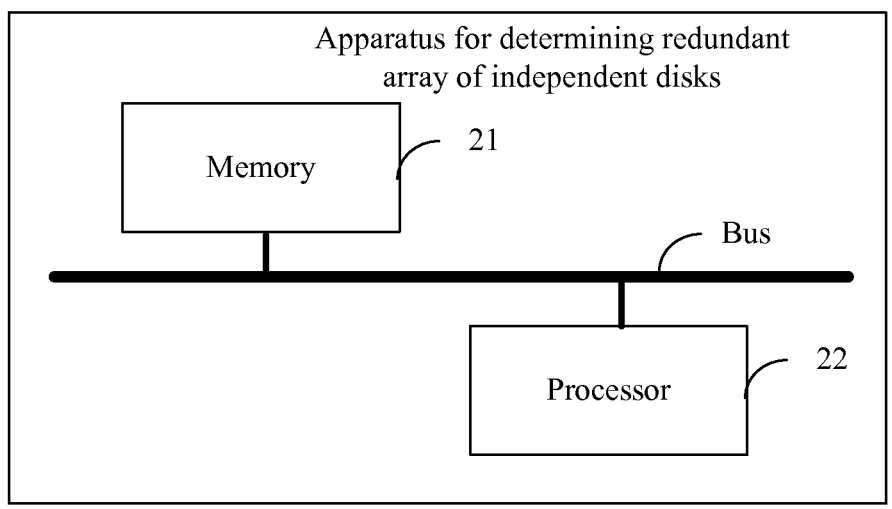
FIG. 8 is a schematic structural diagram of an apparatus for determining a redundant array of independent disks according to still another embodiment of the present invention.

FIG. 8 is a schematic structural diagram of an apparatus for determining a redundant array of independent disks according to still another embodiment of the present invention. As shown in FIG. 8, the apparatus includes:

a memory 21 and a processor 22, where the memory 21 and the processor 22 communicate with each other, the memory 21 is configured to store an instruction, and the processor 22 is configured to run the instruction stored in the memory 21 to execute the following operations:

determining that the number m of disks included in each disk group in n disk groups is the number of redundant arrays of independent disks RAIDs that are constructed by the n disk groups, where each RAID corresponds to one matrix identifier, each disk includes $m^2$ logical blocks, and the n disk groups include $m^2*(m*n)$ logical blocks, where both m and n are positive integers;

generating a third matrix with $m^2$ rows and m*n columns according to a first matrix with 1 row and m columns or a second matrix with m rows and 1 column, where all matrix elements included in the first matrix and the second matrix are matrix identifiers of all RAIDs that are constructed by the n disk groups, the number of matrix identifiers, of each RAID, in matrix elements included in the third matrix is the same, and each matrix element in the third matrix corresponds to a logical block at a same location in the $m^2*(m*n)$ logical blocks in a one-to-one manner; and determining that logical blocks corresponding to matrix elements of a same matrix identifier in the third matrix are one RAID, so that the $m^2*(m*n)$ logical blocks form m RAIDs.

Optionally, the processor 22 may be specifically configured to:

generate n first matrices;

circularly translate a row of matrix elements included in each first matrix towards the left or towards the right for each first matrix, to generate a fourth matrix with m rows and m columns, and form a fifth matrix with m rows and m*n columns by using n fourth matrices; and generate m fifth matrices, and form the third matrix with $m^2$ rows and m*n columns by using the m fifth matrices.

Optionally, columns in which a same matrix element in the n first matrices is located are the same, or columns in which a same matrix element in the n first matrices is located are different.

Optionally, for each first matrix, the number of columns by which a row of matrix elements in each first matrix is circularly translated towards the left or towards the right is the same or different.

Optionally, the processor 22 may be specifically configured to:

generate n second matrices;

circularly translate a column of matrix elements included in each second matrix upward or downward for each second matrix to generate a fourth matrix with m rows and m columns, and form a fifth matrix with m rows and m*n columns by using n fourth matrices; and generate m fifth matrices, and form the third matrix with $m^2$ rows and m*n columns by using the m fifth matrices.

Optionally, rows in which a same matrix element in the n second matrices is located are the same, or rows in which a same matrix element in the n second matrices is located are different.

Optionally, for each second matrix, the number of rows by which a column of matrix elements in each second matrix is circularly translated upward or downward is the same or different.

Optionally, the processor 22 may be specifically configured to:

circularly translate a row of matrix elements included in the first matrix towards the left or towards the right to generate a sixth matrix with m rows and m columns;

translate each row in the sixth matrix upward or downward to generate m*n seventh matrices; and generate the third matrix with $m^2$ rows and m*n columns by using the m*n seventh matrices.

Optionally, each seventh matrix is obtained by translating each row in the sixth matrix upward or downward by the same number of rows or the different number of rows.

Optionally, the processor 22 may be specifically configured to:

circularly translate a column of matrix elements included in the second matrix upward or downward to generate a sixth matrix with m rows and m columns;

translate each column in the sixth matrix towards the left or towards the right to generate m*n seventh matrices; and generate the third matrix with $m^2$ rows and m*n columns by using the m*n seventh matrices.

Optionally, each seventh matrix is obtained by translating each column in the sixth matrix towards the left or towards the right by the same number of columns or the different number of columns.

Optionally, the processor 22 may be specifically configured to:

circularly translate a row of matrix elements included in the first matrix towards the left or towards the right to generate an eighth matrix with m rows and m columns;

translate each column in the eighth matrix towards the left or towards the right to generate m*n ninth matrices; and generate the third matrix with $m^2$ rows and m*n columns by using the m*n ninth matrices.

Optionally, each ninth matrix is obtained by translating each column in the eighth matrix towards the left or towards the right by the same number of columns or the different number of columns.

Optionally, the processor 22 may be specifically configured to:

circularly translate a column of matrix elements included in the second matrix upward or downward to generate an eighth matrix with m rows and m columns;

translate each row in the eighth matrix upward or downward to generate m*n ninth matrices; and generate the third matrix with $m^2$ rows and m*n columns by using the m*n ninth matrices.

Optionally, each ninth matrix is obtained by translating each row in the eighth matrix upward or downward by the same number of rows or the different number of rows.

Optionally, the processor 22 may further be configured to determine that one logical block in one RAID or one logical block in each RAID is hot spare space, where the hot spare space is used to store and recover data.

The apparatus for determining a redundant array of independent disks provided in this embodiment corresponds to the method for determining a redundant array of independent disks provided in the present invention, and is an executing device for the method. For its specific executing process and effect, reference may be made to the related description of the method embodiment, and details are not described herein again.

By using a RAID established in the method and apparatus provided in the foregoing embodiments, concurrency can be fully used to enhance performance of a storage system, and eliminate a hot spot (hot spot) of the system. In addition, based on distributed RAIDs determined by the foregoing method, a size of a matrix decides a size of space occupied for implementing establishment of the RAID, and a space overhead of a CPU is reduced, which facilitates implementation by using a hardware programmable device, such as an FPGA, a CPLD or an ASIC. A relationship between the RAIDs and a physical disk is determined by using the foregoing method embodiment, which facilitates maintenance and leads to relatively high reliability. In addition, by using the RAID established in the method and apparatus provided in the foregoing embodiments, when all disks in 1 disk group are damaged, data can still be recovered, disk reconstruction time is remarkably reduced, and the number of operations for each disk is also remarkably reduced. That is, distribution proportionality is higher. Compared with a conventional non-distributed RAID, as shown in Table 1:

TABLE 1

|  | Conventional RAID | Distributed RAIDs |
| --- | --- | --- |
| Number of disks involved in reconstruction | x-1 | m × (x-1) |

TABLE 1-continued

|  | Conventional RAID | Distributed RAIDs |
| --- | --- | --- |
| Number of operations | Each disk is read for n times | Each disk is read for n/m times; and another disk in a same disk group is read for 0 time |
| Hot spare operation | Hot spare disk is written for n times | Each disk is written for $n/m^2$ times | where x is the number of logical blocks in one stripe, m is the number of disk groups, and n is the number of stripes in one RAID.

In a special case, if a damaged physical block is hot spare space, 1 is subtracted from the number of times for which a disk corresponding to a same row and a same RAID is read.

If a physical block involved in reconstruction is hot spare space, 1 is subtracted from the number of times for which a corresponding disk is read.

The following provides an actual test for reconstruction time of the RAID established in the foregoing method and apparatus embodiments of the present invention.

Testing environment: 3×3 distributed RAIDs (that is, distributed RAIDs in which there are 3 disk groups and each disk group includes 3 disks) are made by using 9 virtual disks in a virtual machine, a RAID 5 is used as a RAID algorithm, and reconstruction time is measured by using initialization time of the RAIDs.

Testing process: A concurrent operation is performed on 6 stripes (stripes) each time. That is, 6 disks are read, and 3 disks are written simultaneously.

Test results are shown in Table 2:

TABLE 2

| Logical array identifier | Total number of stripes | Start time | End time | Consumption time |
| --- | --- | --- | --- | --- |
| 1 | 131071 | 1332713268 | 1332713380 | 112 |
| 2 | 131071 | 1332713366 | 1332713523 | 157 |
| 3 | 131071 | 1332774020 | 1332774206 | 186 |

Test is repeated for 10 times, and consumption time obtained from the test results each time falls within an interval [100, 200]; while in a same condition, consumption time of the conventional RAID basically falls within an interval[200, 500].

Therefore, it may be obtained that, initialization (reconstruction) time of 3 conventional RAIDs is 2-2.5 times that of the distributed RAIDs, the reconstruction time of the distributed RAIDs established in the foregoing method and apparatus embodiments is shorter, and with an increase of the number of disks, the distributed RAIDs have a quite obvious advantage compared with the conventional RAID. In an ideal condition, reconstruction time of m×m (that is, m disk groups and each disk group includes m disks) distributed RAIDs is 1/m of that of the conventional RAID.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A method for determining a redundant array of independent disks, comprising:
    determining, that a number m of disks comprised in each disk group in n disk groups is a number of redundant arrays of independent disks (RAIDs) that are constructed by the n disk groups, wherein each RAID corresponds to one matrix identifier, each disk comprises m2 logical blocks, and the n disk groups comprise m2*(m*n) logical blocks, wherein both m and n are positive integers;
    generating a third matrix with m2 rows and m*n columns according to a first matrix with 1 row and m columns or a second matrix with m rows and 1 column, wherein all matrix elements comprised in the first matrix and the second matrix are matrix identifiers of all RAIDs that are constructed by the n disk groups, a number of matrix identifiers, of each RAID, in matrix elements comprised in the third matrix is the same, and each matrix element in the third matrix corresponds to a logical block at a same location in the m2*(m*n) logical blocks in a one-to-one manner; and
    determining that logical blocks corresponding to matrix elements of a same matrix identifier in the third matrix are one RAID, so that the m2*(m*n) logical blocks form m RAIDs.

2. The method according to claim 1, wherein generating the third matrix with m2rows and m*n columns according to the first matrix with 1 row and m columns further comprises:
    generating n first matrices;
    circularly translating a row of matrix elements comprised in each first matrix towards the left or towards the right for each first matrix, to generate a fourth matrix with m rows and m columns, and forming a fifth matrix with m rows and m*n columns using n fourth matrices; and
    generating m fifth matrices, and forming the third matrix with m2 rows and m*n columns using the m fifth matrices.

3. The method according to claim 2, wherein columns in which a same matrix element in the n first matrices is located are the same, or columns in which a same matrix element in the n first matrices is located are different.

4. The method according to claim 2, wherein for each first matrix, a number of columns by which a row of matrix elements in each first matrix is circularly translated towards the left or towards the right is the same or different.

5. The method according to claim 1, wherein generating the third matrix with m2 rows and m*n columns according to the second matrix with m rows and 1 column further comprises:
    generating n second matrices;
    circularly translating a column of matrix elements comprised in each second matrix upward or downward for each second matrix to generate a fourth matrix with m rows and m columns, and forming a fifth matrix with m rows and m*n columns by using n fourth matrices; and
    generating m fifth matrices, and forming the third matrix with m2 rows and m*n columns using the m fifth matrices.

6. The method according to claim 5, wherein rows in which a same matrix element in the n second matrices is located are the same, or rows in which a same matrix element in the n second matrices is located are different.

7. The method according to claim 5, wherein for each second matrix, a number of rows by which a column of matrix elements in each second matrix is circularly translated upward or downward is the same or different.

8. The method according to claim 1, wherein generating the third matrix with m2 rows and m*n columns according to the first matrix with 1 row and m columns further comprises:
    circularly translating a row of matrix elements comprised in the first matrix towards the left or towards the right to generate a sixth matrix with m rows and m columns;
    translating each row in the sixth matrix upward or downward to generate m*n seventh matrices; and
    generating the third matrix with m2 rows and m*n columns using the m*n seventh matrices.

9. The method according to claim 8, wherein each seventh matrix is obtained by translating each row in the sixth matrix upward or downward by the same number of rows or the different number of rows.

10. The method according to claim 1, wherein generating the third matrix with m2 rows and m*n columns according to the second matrix with m rows and 1 column further comprises:
    circularly translating a column of matrix elements comprised in the second matrix upward or downward to generate a sixth matrix with m rows and m columns;
    translating each column in the sixth matrix towards the left or towards the right to generate m*n seventh matrices; and
    generating the third matrix with m2 rows and m*n columns using the m*n seventh matrices.

11. The method according to claim 10, wherein each seventh matrix is obtained by translating each column in the sixth matrix towards the left or towards the right by the same number of columns or the different number of columns.

12. The method according to claim 1, wherein generating the third matrix with m2 rows and m*n columns according to a first matrix with 1 row and m columns specifically comprises:
    circularly translating a row of matrix elements comprised in the first matrix towards the left or towards the right to generate an eighth matrix with m rows and m columns;
    translating each column in the eighth matrix towards the left or towards the right to generate m*n ninth matrices; and
    generating the third matrix with m2 rows and m*n columns using the m*n ninth matrices.

13. The method according to claim 12, wherein each ninth matrix is obtained by translating each column in the eighth matrix towards the left or towards the right by the same number of columns or the different number of columns.

14. The method according to claim 1, wherein generating the third matrix with m2 rows and m*n columns according to the second matrix with m rows and 1 column further comprises:
    circularly translating a column of matrix elements comprised in the second matrix upward or downward to generate an eighth matrix with m rows and m columns;
    translating each row in the eighth matrix upward or downward to generate m*n ninth matrices; and
    generating the third matrix with m2 rows and m*n columns using the m*n ninth matrices.

15. The method according to claim 14, wherein each ninth matrix is obtained by translating each row in the eighth matrix upward or downward by the same number of rows or the different number of rows.

16. The method according to claim 1, after generating the third matrix with m2 rows and m*n columns according to the first matrix with 1 row and m columns and the second matrix with m rows and 1 column, further comprising:
determining that one logical block in one RAID or one logical block in each RAID is hot spare space, wherein the hot spare space is used to store and recover data.

17. An apparatus for determining a redundant array of independent disks, comprising:
a determining module, configured to determine that a number m of disks comprised in each disk group in n disk groups is a number of redundant arrays of independent disks (RAIDs) that are constructed by the n disk groups, wherein each RAID corresponds to one matrix identifier, each disk comprises m2 logical blocks, and the n disk groups comprise m2*(m*n) logical blocks, wherein both m and n are positive integers;
a generating module, configured to generate a third matrix with m2 rows and m*n columns according to a first matrix with 1 row and m columns or a second matrix with m rows and 1 column, wherein all matrix elements comprised in the first matrix and the second matrix are matrix identifiers of all RAIDs that are constructed by the n disk groups, a number of matrix identifiers, of each RAID, in matrix elements comprised in the third matrix is the same, and each matrix element in the third matrix corresponds to a logical block at a same location in the m2*(m*n) logical blocks in a one-to-one manner; and
a constructing module, configured to determine that logical blocks corresponding to matrix elements of a same matrix identifier in the third matrix are one RAID, so that the m2*(m*n) logical blocks form m RAIDs.

18. An apparatus for determining the redundant array of independent disks, comprising a memory and a processor, wherein the memory and the processor communicate with each other, the memory is configured to store an instruction, and the processor is configured to run the instruction stored in the memory, so as to execute the method according to claim 1.

19. The apparatus according to claim 17, wherein the generating module is configured to: generate n first matrices; circularly translate a row of matrix elements comprised in each first matrix towards the left or towards the right for each first matrix, to generate a fourth matrix with m rows and m columns, and form a fifth matrix with m rows and m*n columns using n fourth matrices; and generate m fifth matrices, and form the third matrix with m2 rows and m*n columns using the m fifth matrices.

20. The apparatus according to claim 19, wherein columns in which a same matrix element in the n first matrices is located are the same, or columns in which a same matrix element in the n first matrices is located are different.

21. The apparatus according to claim 19, wherein for each first matrix, a number of columns by which a row of matrix elements in each first matrix is circularly translated towards the left or towards the right is the same or different.

22. The apparatus according to claim 17, wherein the generating module is configured to: generate n second matrices; circularly translate a column of matrix elements comprised in each second matrix upward or downward for each second matrix to generate a fourth matrix with m rows and m columns, and form a fifth matrix with m rows and m*n columns by using n fourth matrices; and generate m fifth matrices, and form the third matrix with m2 rows and m*n columns using the m fifth matrices.

23. The apparatus according to claim 22, wherein rows in which a same matrix element in the n second matrices is located are the same, or rows in which a same matrix element in the n second matrices is located are different.

24. The apparatus according to claim 22, wherein for each second matrix, a number of rows by which a column of matrix elements in each second matrix is circularly translated upward or downward is the same or different.

25. The apparatus according to claim 17, wherein the generating module is configured to: circularly translate a row of matrix elements comprised in the first matrix towards the left or towards the right to generate a sixth matrix with m rows and m columns; translate each row in the sixth matrix upward or downward to generate m*n seventh matrices; and generate the third matrix with m2 rows and m*n columns using the m*n seventh matrices.

26. The apparatus according to claim 25, wherein each seventh matrix is obtained by translating each row in the sixth matrix upward or downward by the same number of rows or the different number of rows.

27. The apparatus according to claim 17, wherein the generating module is configured to: circularly translate a column of matrix elements comprised in the second matrix upward or downward to generate a sixth matrix with m rows and m columns; translate each column in the sixth matrix towards the left or towards the right to generate m*n seventh matrices; and generate the third matrix with m2 rows and m*n columns using the m*n seventh matrices.

28. The apparatus according to claim 27, wherein each seventh matrix is obtained by translating each column in the sixth matrix towards the left or towards the right by the same number of columns or the different number of columns.

29. The apparatus according to claim 17, wherein the generating module is configured to: circularly translate a row of matrix elements comprised in the first matrix towards the left or towards the right to generate an eighth matrix with m rows and m columns; translate each column in the eighth matrix towards the left or towards the right to generate m*n ninth matrices; and generate the third matrix with m2 rows and m*n columns using the m*n ninth matrices.

30. The apparatus according to claim 29, wherein each ninth matrix is obtained by translating each column in the eighth matrix towards the left or towards the right by the same number of columns or the different number of columns.

31. The apparatus according to claim 17, wherein the generating module is configured to: circularly translate a column of matrix elements comprised in the second matrix upward or downward to generate an eighth matrix with m rows and m columns; translate each row in the eighth matrix upward or downward to generate m*n ninth matrices; and generate the third matrix with m2 rows and m*n columns using the m*n ninth matrices.

32. The apparatus according to claim 31, wherein each ninth matrix is obtained by translating each row in the eighth matrix upward or downward by the same number of rows or the different number of rows.

33. The apparatus according to claim 17, wherein the determining module is further configured to determine that one logical block in one RAID or one logical block in each RAID is hot spare space, wherein the hot spare space is used to store and recover data.

* * * * *